United States Patent [19]

Nobileau et al.

[11] 4,133,180
[45] Jan. 9, 1979

[54] APPARATUS FOR WELDING SUBMERGED PIPE ENDS

[75] Inventors: Philippe C. Nobileau, Neuilly sur Seine; René M. Dermy, Courcouronnes; Guy J. Fleury, Paris, all of France

[73] Assignees: Compagnie Francaise des Petroles, Paris; Etudes Petrolieres Marines, Paris; Ateliers et Chantiers de Bretagne-A.C.B., Nantes; Compagnie Maritime d'Expertises, Marseille; Compagnie Generale pour les Developpements Operationnels des Richesses Sous-Marines (Doris), Paris; Societe Nationale Elf Aquitaine (Production), Courbevoie, all of France

[21] Appl. No.: 700,680

[22] Filed: Jun. 28, 1976

[30] Foreign Application Priority Data

Jul. 2, 1975 [FR] France .................................. 75 20785

[51] Int. Cl.² ............................................ B63C 11/00
[52] U.S. Cl. ...................................... 405/170; 219/72; 219/137 R; 405/185
[58] Field of Search ............. 219/137 R, 72; 61/69 R, 61/69 A, 110, 111; 285/286, 399

[56] References Cited

U.S. PATENT DOCUMENTS

| | | | |
|---|---|---|---|
| 1,291,601 | 1/1919 | Murray | 219/137 R |
| 1,872,271 | 8/1932 | Furrer | 285/399 X |
| 3,339,011 | 8/1967 | Ewers | 174/93 X |
| 3,641,777 | 2/1972 | Bajavich | 219/72 X |
| 3,658,231 | 4/1972 | Gilman | 61/69 R |
| 3,795,115 | 3/1974 | Bergquist | 61/111 |

*Primary Examiner*—E. A. Goldberg
*Attorney, Agent, or Firm*—Sughrue, Rothwell, Mion, Zinn and Macpeak

[57] ABSTRACT

In a method of welding together two submerged pipe ends, the pipe ends are spaced apart and introduced through orifices into a receptacle by which they can be isolated from the surrounding medium. The spaced pipe ends are connected by a connection sleeve and after isolation are welded to the connection sleeve.

10 Claims, 9 Drawing Figures

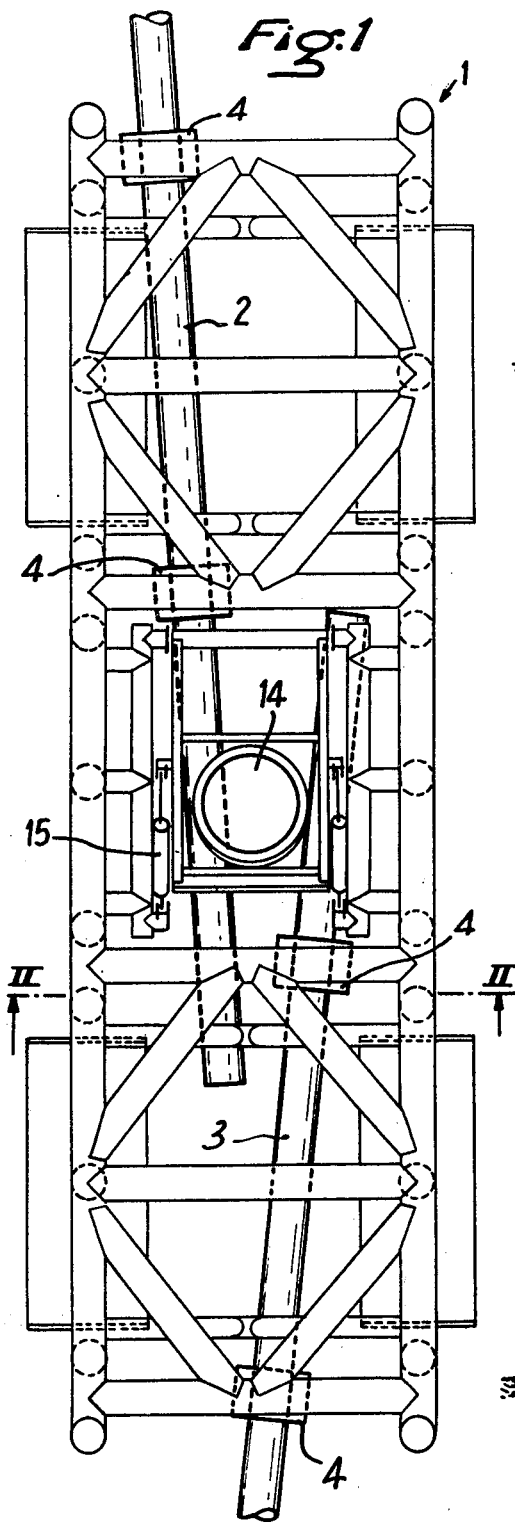
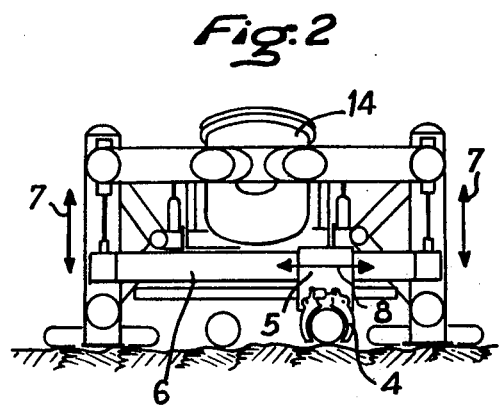
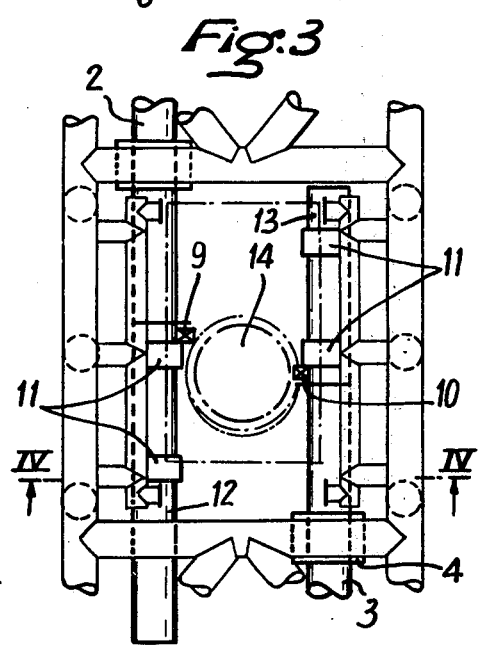
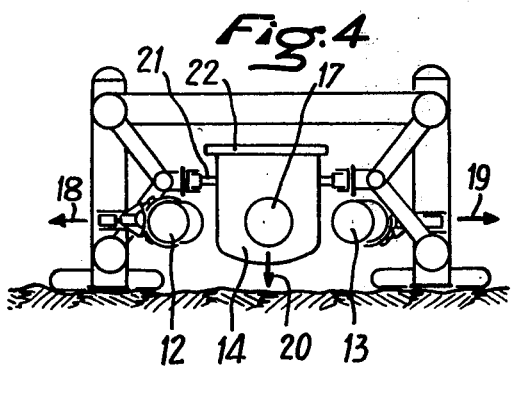

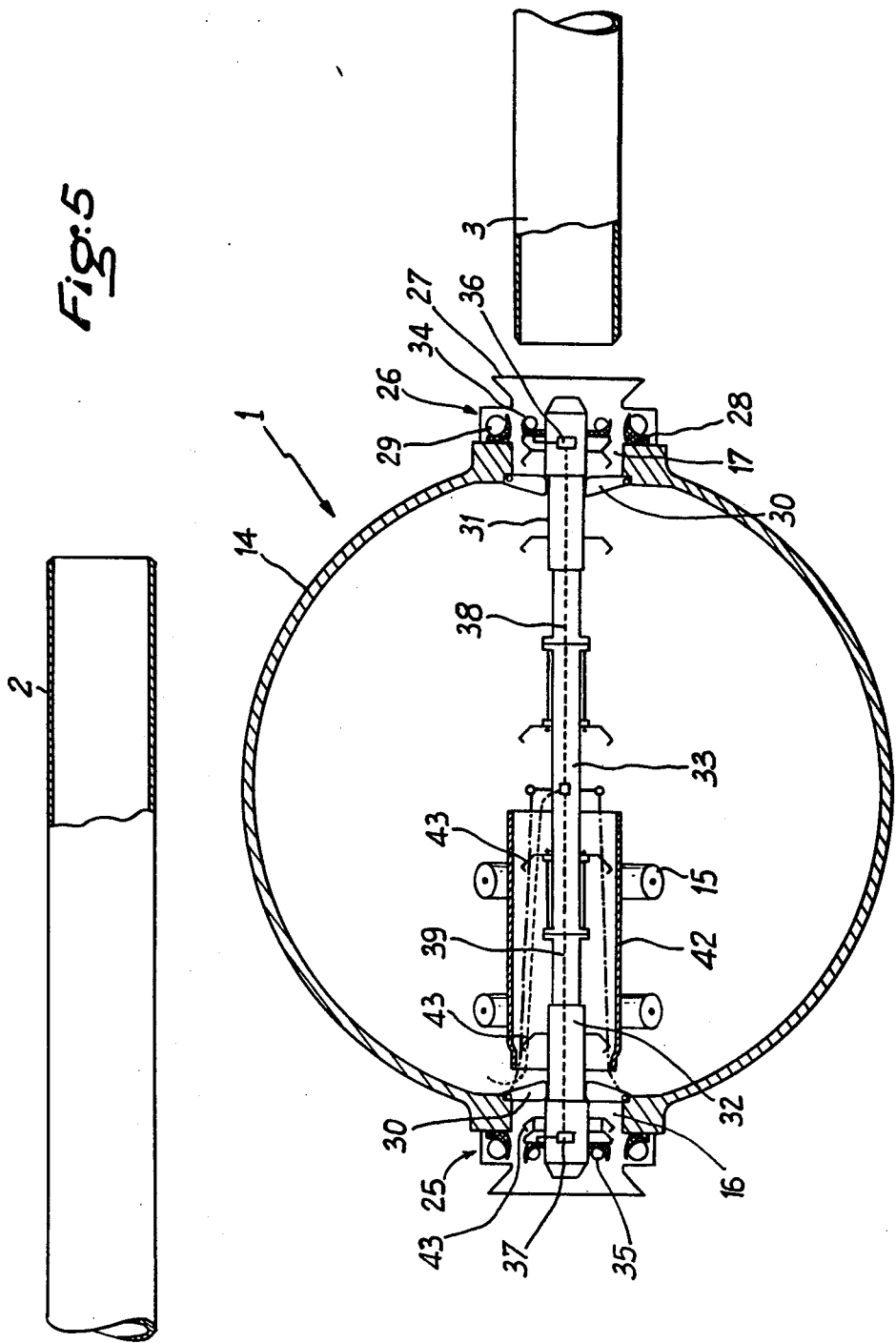

APPARATUS FOR WELDING SUBMERGED PIPE ENDS

The invention relates to the connection, in deep water, of two ends of submerged piping, the welding of the ends being effected in a gaseous medium.

The need to ensure an effective weld, the welding being effected out of contact with water, at depths beyond the reach of divers, has led to a search for a method of connection in deep water wherein reliable devices can be used and which ensures the safety of any team involved.

It is an object of the invention to provide a method of connecting, by welding, the ends of two submerged pipes, comprising surrounding said ends of said two pipes by a receptacle carrying a connection sleeve, making said receptacle watertight by connection thereto of a submarine intervention unit, and welding said pipe ends to said connection sleeve.

In a preferred embodiment said ends of said pipes are introduced into said receptacle through two diametrically opposite orifices provided in the wall of said receptacle, the spacing of the ends of said pipes being adjusted by cutting portions off. One of said pipe ends is caused to penetrate into one of said orifices by displacement of said receptacle towards the corresponding pipe, said other pipe is brought opposite said opposite orifice, and then said second pipe is introduced into said opposite orifice by displacement of said receptacle in the opposite direction to said first displacement.

Advantageously isolation of the ends of the pipes from the marine medium is assured by providing external sealing means at the peripheries of said orifices, internal sealing means on the axis of said orifices for sealing against the inner surfaces of said pipes and which are held spaced apart by a boom withstanding the internal pressures existing in the pipes, and an annular surface for connection to said submarine intervention unit, said sealing means being controlled after introduction of said pipes in such a manner that it is then sufficient to connect said receptacle to said submarine intervention unit, to empty said receptacle of water and to bring it into communication with said intervention unit, wherein said ends of said pipes are situated in a gaseous enclosure.

In this manner, the working team can penetrate, in complete safety, even at a very great depth, into the sealed enclosure, to effect the welding of the pipes.

Said connection sleeve is preferably first disposed in said receptacle and coaxial with said orifices, at least one portion of said sleeve having an internal diameter greater than the external diameter of one of said pipes to be connected, said sleeve being displaced after the receptacle has been brought to atmospheric pressure until it ensures the continuity of the two pipes. Said internal sealing means are preferably operated after the welding to release them from the internal walls of said pipes and are then moved to one of the free ends of one pipe by simple application of pressure to the other end of the other pipe.

Thus welding can be effected in a gaseous medium and in safety because the internal and external sealing means are held in position by bearing against one another during the welding operation.

Additionally cutting of said pipes does not have to be effected to provide a precise spacing between the ends of said pipes because it is merely sufficient for the said connection sleeve to be longer than the spacing of the ends of said pipes.

It is another object of the invention to provide a device for carrying out the above method comprising a structure for displacing and aligning submerged pipes and including a receptacle having a wall providing an opening for connection to a submarine intervention unit, two orifices each having a diameter greater than the external diameter of the pipes to be connected, sealing means arranged around said orifices for sealing between the external surfaces of the pipes and said receptacle, and a connection sleeve resting on a support in said receptacle, one of the ends of said sleeve having an internal diameter greater than the external diameter of the pipe to be connected.

Said device advantageously includes an internal sealing means for closing and sealing against the inner surfaces of said pipe to be connected, these internal sealing means being held spaced apart to be at the level of said orifices by a distance piece and comprising cups having the same orientation.

Said cups may not only ensure the centering of said internal sealing means and of said distance piece in said pipes, but further enable said internal sealing means and said distance piece to be entrained, after welding, simply by placing one pipe under pressure at the concave side of said cups.

Said support for said connection sleeve may be a roller support, said connection sleeve being supported about said internal sealing means and distance piece. In this manner, the positioning of said internal sealing means and of said distance piece is essentially longitudinal, said sleeve being supported exclusively by rollers facilitating its axial displacement.

Said internal sealing means are advantageously supported by support means which are retractable towards the interior of said receptacle.

In this way it is sufficient to provide a distance piece of adequate length for said internal sealing means to be positioned level with said orifices and to contribute to ensuring the centering of the respective internal sealing means inside the pipe in the course of introduction into the receptacle, at the moment when the end of the pipe causes retraction of said support means initially supporting said internal sealing means.

The invention will be more fully understood from the following description given of an embodiment thereof, given by way of example only, with reference to the accompanying drawings.

In the drawings:

FIG. 1 is a plan view of an embodiment of a device in accordance with the invention;

FIG. 2 is the section on the line II—II of FIG. 1;

FIG. 3 is a plan view of part of the device of FIG. 1 after the pipes have been brought parallel;

FIG. 4 is a section on the line IV—IV of FIG. 3;

FIG. 5 is an axial section through a receptacle;

Figure 6:
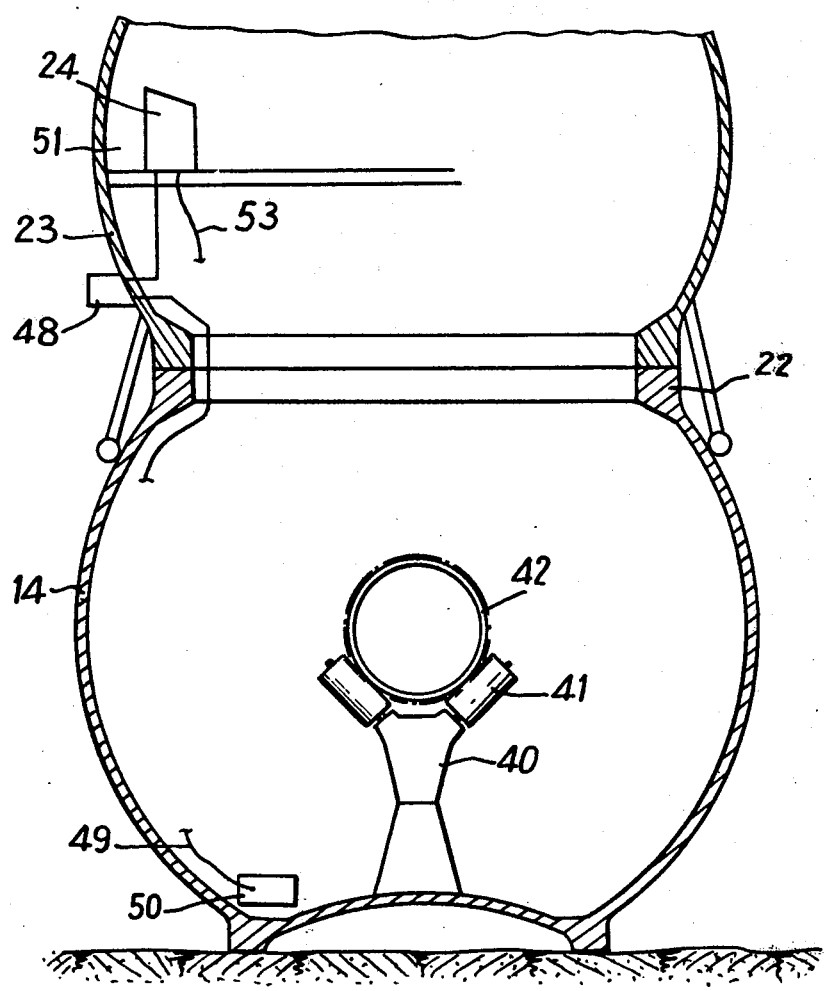
FIG. 6 is a section on the line VI—VI of FIG. 5 after connection of a submarine intervention unit.

The structure 1, which comprises conventional elements for the handling of pipes such as pipes 2 and 3, is by way of example only and may be replaced by any suitable handling structure of the type comprising pincers 4 mounted on movable supports 5 and 6, the object of which is to grasp the pipes 2, 3 to raise them as indicated diagrammatically in FIG. 2 by the arrows 7 and to displace them laterally as indicated by the arrows 8. In this manner, the pipes 2 and 3 can be made parallel and brought opposite circular countersinks 9 and 10. Pincers 11 enable the end pipe portions 12 and 13 to be withdrawn after cutting of the pipes in the direction of the arrows 18, 19 (FIG. 4).

As shown the structure 1, also called a liner, supports a receptacle 14. Jacks 15, FIG. 1, are operable to move the receptacle. After cutting of the sections 12 and 13, the receptacle 14 is lowered from the position shown in FIG. 2 to that shown in FIG. 4 in the direction of the arrow 20. In this position, the pipes 2 and 3 are at the same level as diametrically opposed orifices 16 and 17 (FIG. 5) in the side wall of the receptacle. In FIG. 4, the receptacle 14 can pivot about shafts 21. It comprises an annular or rim flange 22 surrounding an opening in its upper portion on which, in the position illustrated, a suitable submarine intervention unit will seat. Since such units are already known, a portion only of a diving bell is illustrated diagrammatically at 23 in FIG. 6. The bell is equipped with a source of electrical energy and with a control consol 24, and is connected in a watertight manner to the rim 22 of the receptacle 14.

The orifices 16 and 17 of the receptacle 14 are edged by sealing devices 25 and 26 which may be as described in U.S. Pat. No. 4,045,035.

Each device preferably comprises a guide cone 27, a lip seal 28 and means 29 to control application of the lip seal 28. Such means may for example comprise an inflatable chamber adjoining the lip seal and normally holding it in a raised position providing clearance to permit the introduction of e.g. the pipe 3 into the orifice 17. Deflation of the chamber, obtained for example by means of a control signal from the desk 24 via the cable 53, leads to the removal of the forces raising lip seal 28 which then lies flat against the pipe 3 (FIG. 8) under the effect of the hydrostatic pressure. Since the control or remote-control means may be of any known kind and are well known they will not be described.

Each of the orifices 16, 17 is provided with retractable lugs 30 supporting obturators 31 32, the ends of which are juxtaposed with the ends of a boom or distance piece 33, in such a manner that inflatable seals 34 and 35 on the obturators 31, 32, similar to seals 25, 26 and under the control of respective electrically operated valves 36 and 37, FIG. 5, are vertically in line with the seals 25 and 26. The electrically operated valves 36, 37 are connected to control lines 38 and 39 ending at suitable signal receiving device, or at automatic devices for connection to the cable 53 of the control desk 24 before the door giving access from the bell 23 to the receptacle 14 is opened. It will be noted, however, that this embodiment is particularly suitable for operation by remote-control devices through a wall constituting an enclosure, the receptacle 14, such for example as are operated by gamma radiation or coded acoustic signals. In the first case, it is sufficient to bring the source of gamma radiation of a particular isotope opposite a Geiger counter forming part of the receptacle and placed at the other side of the wall for a given time to start any electric circuit actuating e.g. an electrically operated valve, normally closed or normally open, in a hydraulic or pneumatic circuit. In the second case, it is sufficient to equip each electrically operated valve with a receiving device which only responds to the coded control signals adopted.

In addition to the lugs 30, the receptacle 14 comprises a support 40, FIG. 6, equipped with rollers 41 supporting a sleeve 42 through which the obturator 32 and the boom 33 extend, FIG. 5.

When the end sections 12 and 13 of the pipes have been cut off, the liner 1 displaces the pipe 3 laterally to bring it into line with the axis of the obturator 31, FIG. 1. The receptacle 14 is then displaced longitudinally by the liner so that it passes from the position illustrated in FIG. 5 to that of FIG. 7. In the course of this introduction of the pipe 3, only the lugs 30 of the orifice 17 are retracted, the obturator 31 being supported by cups 43 on the obturator and bearing against the pipe 3. It will be noted that all the cups mounted on the boom 33 and on the obturators 31 and 32 have their concavity in the same direction although the obturators are orientated in opposite directions. This reversed arrangement facilitates the assembly of the obturators with the boom 33 by means of simple threaded rods or screws 44, FIG. 7.

Figure 7:
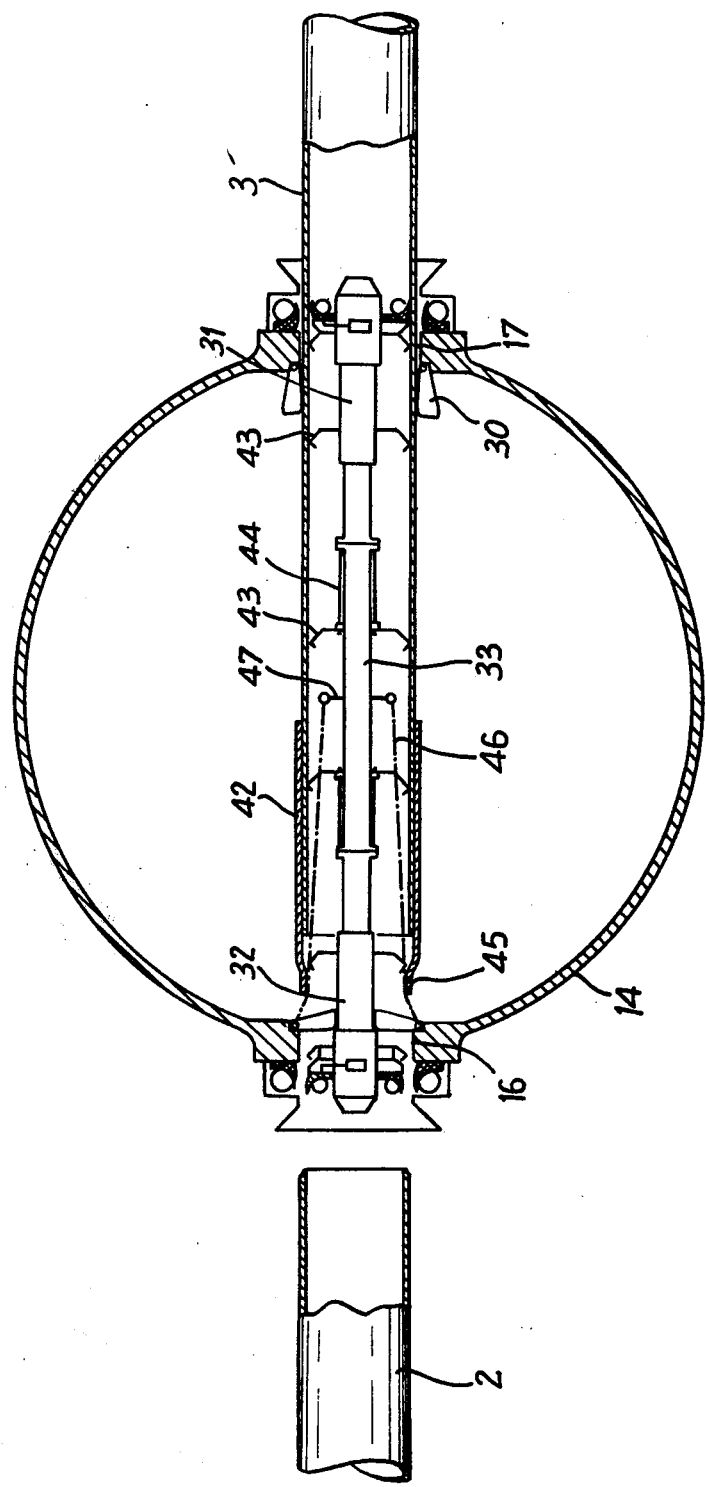
FIG. 7 is the partial section through the receptacle after introduction of a first pipe.
Figure 8:
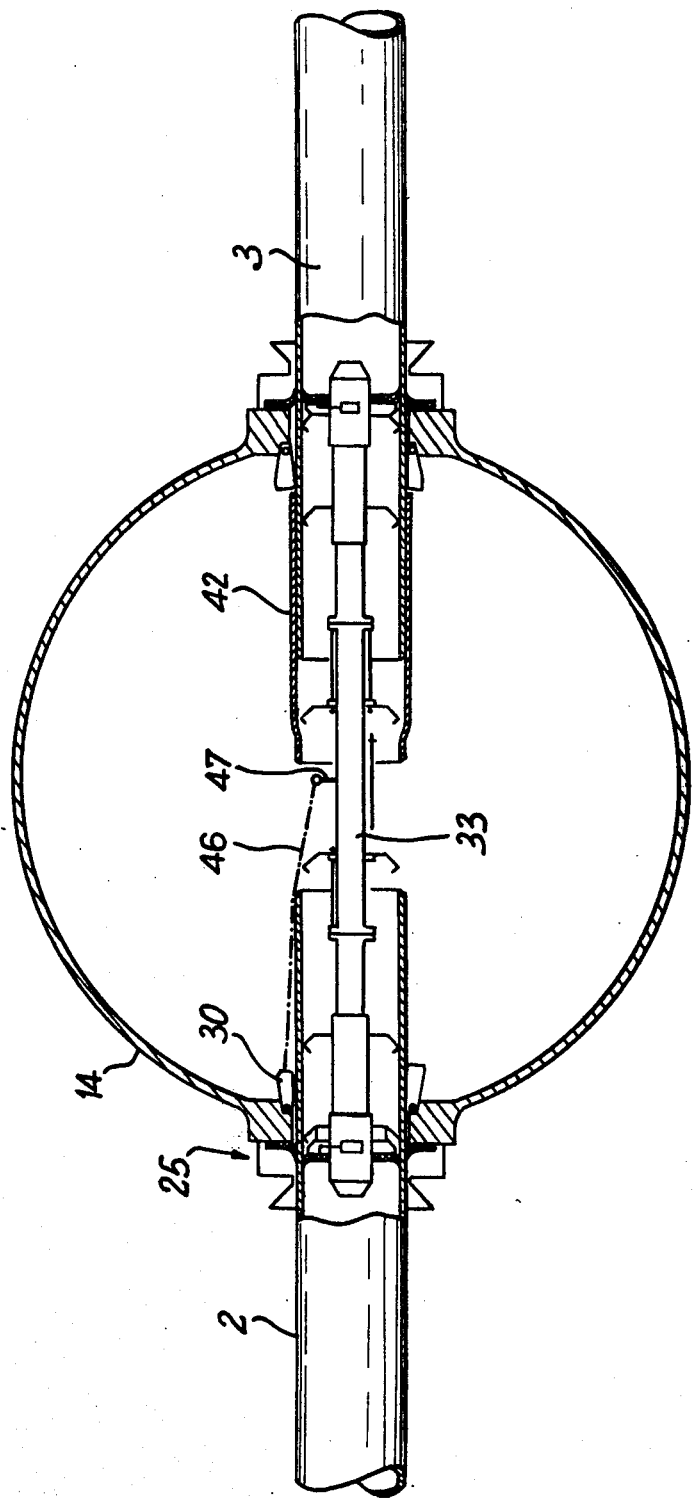
FIG. 8 is the partial section similar to FIG. 7 after introduction of both pipes.

Since the difference between the internal diameter of the sleeve 42 and the external diameter of the pipe 3 is slight, the simple driving in of the end of the pipe 3 towards the restricted portion 45 of the sleeve 42, FIG. 7, is sufficient to create frictional forces between the pipe 3 and sleeve 42 over a sufficient length so that, by moving the receptacle 14 back towards the pipe 2, after pipe 2 has been disposed in line with the orifice 16, the sleeve 42 remains relative to the pipe 3 in the position illustrated in FIG. 8. In the course of this displacement, the lugs 30 of orifice 16 are retracted but the obturators 31, 32 slide with the receptacle 14 so that the seal 35 of the obturator 32 remains opposite the seal 25 and consequently penetrates sufficiently inside the pipe 2, FIG. 8. For this purpose, the lugs 30 are connected by cables 46 to an attachment system 47 fixed to the boom 33.

Figure 9:
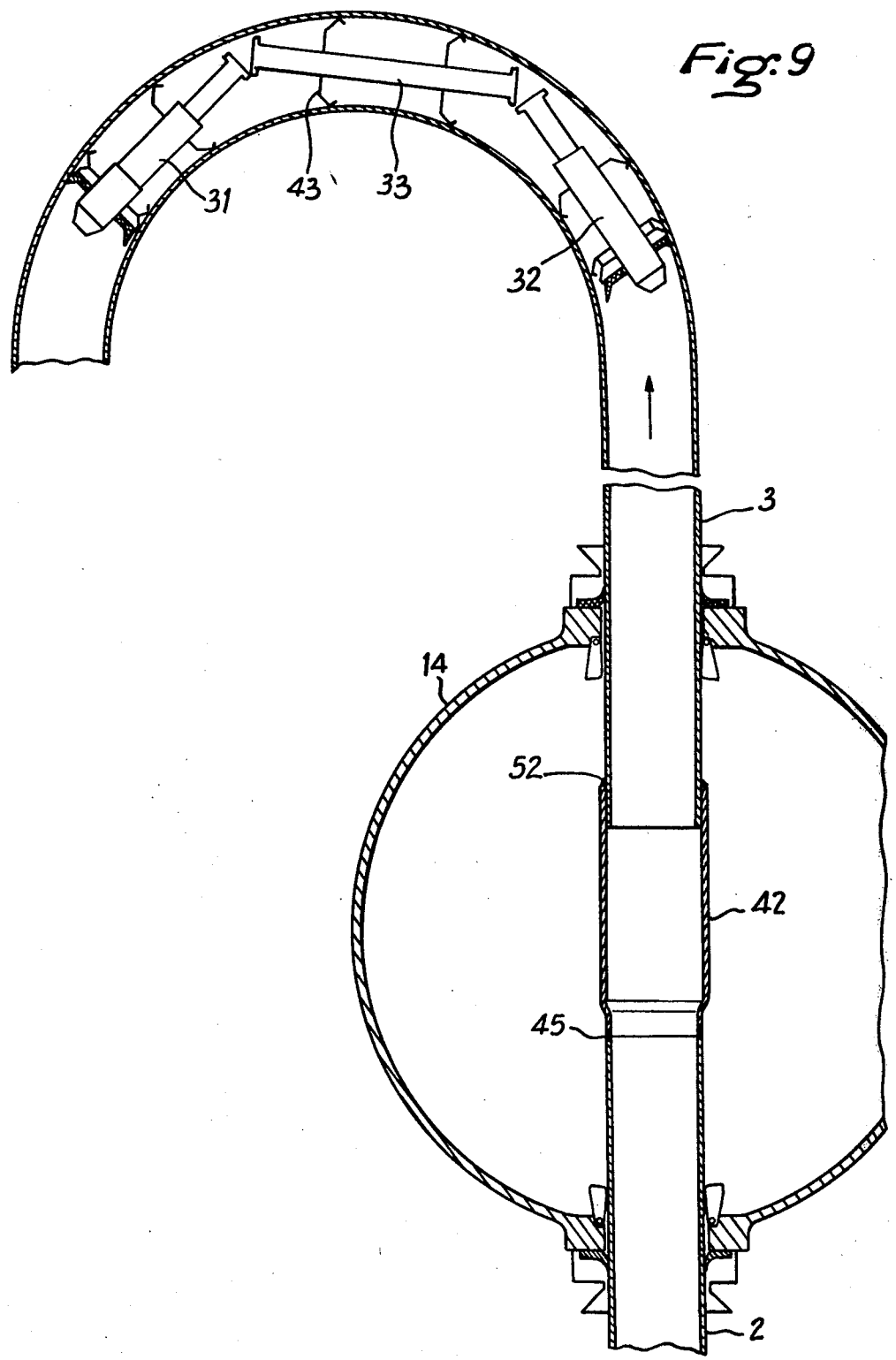
FIG. 9 is the partial section similar to FIG. 7 after connection and welding of the pipes.

When the position shown in FIG. 8 has been reached and the submarine intervention unit 23 has been brought to bear on the receptacle, the sealing means 25, 26, 34 and 35 are controlled so that the lip seals of the orifices 16 and 17 lie flat against the external walls of the pipes 2 and 3 and the lip seals of the obturators 31 and 32 are pushed back against the internal walls of the pipes. Under these conditions, it is sufficient to operate, from the desk 24 (FIG. 6), a pump 48 which is automatically connected to a tube 49 leading to a rose 50, to empty to receptacle 14 and then bring it into communication with the control chamber 51 of the unit 23 at atmospheric pressure. The working team can then descend into the receptacle, unhook the cables 46, withdraw the threaded rods 44 to release the ends of the obturators 31 and 32 from the boom, and cause the sleeve 42 to slide until it abuts against the tube 2, as illustrated in FIG. 9. It is then sufficient to weld the end 45 of the sleeve, which has the same diameter as the pipe 2, to the pipe 2 and to weld the opposite end 52 of the sleeve to the pipe 3. When this operation has been carried out, the release of the obturators 31 and 32 can be effected by operation of the electrically operated valves 36 and 37. As already explained, the remote-controls may be of any kind. By way of example, the means for obtaining release of the seals may include a pyrotechnical striker actuated by the emission of coded sound signals, this striker causing the pressure of the oleopneumatic circuit for inflating the obturator seals to drop. Since the seals are no longer urged against the internal walls of the connected pipes, it is sufficient to apply a pressure in the pipe 2 greater than the pressure in the pipe 3 to entrain, by means of the cups 43 which all have the same orientation, the obturators 31 and 32 as well as the boom 33 (FIG. 9) which are thus evacuated from the other end of the pipe 3.

The working team finally leave the site in the submarine intervention unit 23 and the receptacle, which represents a very small part of the total cost of the operation is left on the sea bed.

Although only one embodiment has been described of the means for carrying out the connection and welding in a gaseous atmosphere of two submerged pipes, it goes without saying that numerous additions, eliminations or modifications can be made to the elements described without departing from the scope of the present invention.

What is claimed is:

1. A device for connecting by welding, the ends of two equal diameter, submerged pipes, said device comprising:
    a structure for displacing and aligning submerged pipes,
    an open, first receptacle having a wall providing an opening for sealed connection to a submarine intervention unit,
    a submarine intervention unit comprising a sealed, second receptacle having an opening therein in sealed connection to the opening within said first receptacle,
    opposed axially aligned orifices within said first receptacle, each orifice having a diameter greater than the external diameter of the pipes to be connected,
    means for mounting said first receptacle on said structure for displacement relative to said submerged pipes on opposite sides of said first receptacle and in alignment with said orifices,
    sealing means arranged around said orifices for sealing between the external surfaces of the pipes and said first receptacle,
    a support within said first receptacle,
    and a connection sleeve resting on said support in axial alignment with said orifices with one of the ends of said sleeve being sized equal to that of said pipes and the other end of said sleeve having an internal diameter slightly greater than the external diameter of the pipes so as to telescopically receive one of said pipes during displacement of said receptacle on said structure relative to said one pipe and passage of said one pipe through a corresponding orifice which receives the same, such that by connection of said submarine intervention unit to said receptacle in a water tight manner, the water can be evacuated from said receptacle and replaced with air at atmospheric pressure to facilitate welding of said one pipe to the end of said sleeve telescopically receiving said one pipe and the other of said pipes at its abutment to the other end of the sleeve having the same diameter thereto.

2. A device as claimed in claim 1, comprising internal sealing means for sealing against the inner surfaces of said pipes and means for controlling operation of said internal sealing means comprising at least one receiver sensitive to a signal transmitted through said wall of said receptacle, said internal sealing means being disposed on the axis of said orifices.

3. A device as claimed in claim 2, wherein said internal sealing means include cups coaxial with said orifices and each having an external diameter less than the internal diameter of said pipes.

4. A device as claimed in claim 4, wherein said internal sealing means have a length such that, when in their inoperative condition, they are freely displaceable longitudinally inside portions of said pipes having the greatest curvature and are assembled with an intermediate coaxial boom provided with cups similar to said cups of said internal sealing means.

5. A device as claimed in claim 2, wherein each of said internal sealing means is supported by a retractable support means.

6. A device as claimed in claim 5, wherein said retractable support means comprise lugs mounted to said receptacle at said orifices and pivotable inwardly of said receptacle on introduction of the pipes through said orifices.

7. A device as claimed in claim 2, wherein said internal sealing means are fixed relative to said receptacle to fixing means connected to said receptacle.

8. A device as claimed in claim 7, wherein said fixing means comprise a cable, one end of which is connected to said receptacle and the other end of which is detachably connected to a boom the ends of which are detachably connected to said internal sealing means.

9. A device as claimed in claim 8, wherein said internal sealing means are arranged to be opposed, opposite ends being connected to respective opposite ends of said boom, said cups being mounted on said boom and said internal sealing means having the same orientation.

10. A device as claimed in claim 1, wherein said external sealing means comprise controllable lip seals.

* * * * *